United States Patent
Zhang et al.

(10) Patent No.: US 8,611,917 B2
(45) Date of Patent: Dec. 17, 2013

(54) LTE AND LTE-ADVANCED UL POWER CONTROL

(75) Inventors: Honghai Zhang, Seattle, WA (US); Narayan Prasad, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/617,766

(22) Filed: Sep. 14, 2012

(65) Prior Publication Data

US 2013/0072210 A1   Mar. 21, 2013

Related U.S. Application Data

(60) Provisional application No. 61/535,636, filed on Sep. 16, 2011.

(51) Int. Cl.
  *H04W 72/00*   (2009.01)

(52) U.S. Cl.
  USPC ..... 455/452.1; 455/450; 455/522; 455/422.1; 455/423

(58) Field of Classification Search
  USPC ............... 455/452.1, 450, 522, 422.1, 423
  See application file for complete search history.

(56) References Cited

U.S. PATENT DOCUMENTS

| | | | |
|---|---|---|---|
| 8,358,619 B2 * | 1/2013 | Cho et al. | 370/329 |
| 2011/0003608 A1 * | 1/2011 | Forenza et al. | 455/501 |

* cited by examiner

*Primary Examiner* — Nghi H Ly
(74) *Attorney, Agent, or Firm* — Joseph Kolodka

(57) ABSTRACT

A method for LTE and LTE-A uplink power control includes open loop power control where user equipment UE measures downlink pathloss which is sent to an eNodeB that determines uplink UL transmit power based on the downlink pathloss.

4 Claims, 3 Drawing Sheets

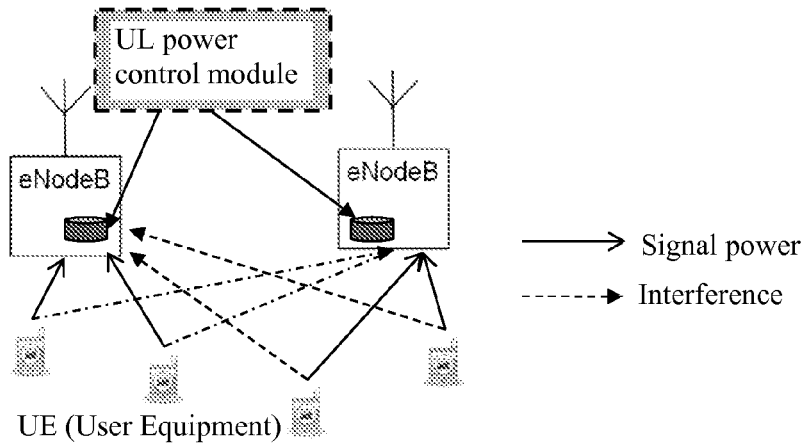

Fig. 1A

UE estimates the DL pathloss (including shadowing) $PL_{DL,i}$ and $PL_{DL,i}^{sPNB}$ from the serving cell and the most strongly interfered neighboring cell — 110 eNodeB determines the transmit PSD (which is the per-RB transmit power): $PSD_i = \min(PSD_{max}, P_0 + \alpha \cdot PL_{DL,i} + \delta^{max}, \Gamma_0 + PL_{DL,i}^{sPNB})$ where $PSD_{max}$ is the maximum transmit PSD, $P_0$ is the desired receiving power, $\alpha$ is the fraction of the pathloss compensation, $\delta^{max}$ is the maximum power increase over FPC, and $\Gamma_0$ is the target interference power. — 120

Fig. 2A

LTE AND LTE-ADVANCED UL POWER CONTROL

RELATED APPLICATION INFORMATION

This application claims priority to provisional application No. 61/535,636 filed Sep. 16, 2011, the contents thereof are incorporated herein by reference

BACKGROUND OF THE INVENTION

The present invention relates generally to wireless communications, and more particularly, to long term evolution LTE and long term evolution advanced LTE-A uplink UL power control.

In LTE and LTE-Advanced systems, uplink power control is crucial to reduce the interference and improve system throughput. 3GPP has defined fractional power control (FPC) to control the uplink transmission power. The major issue is that the interference created at neighboring cells highly depends on the users scheduled in the present cell. As a result, signal-to-interference-noise-ration SINR estimation, user scheduling, and modulation and coding scheme MCS selection become challenging in neighboring cells.

There has been a proposal to compensate the transmit power by a fraction of the difference between the pathloss to the serving cell and that to the second strongest cell. Another technique proposed to continuously adjust the transmission power to maintain a target total interference power a user creates to the entire system. However, the individual interference a user creates to a given neighboring cell may still be highly variable and heavily dependent on the user that is scheduled in the present cell.

Accordingly, there is a need for improved LTE and LTE-A uplink power control.

BRIEF SUMMARY OF THE INVENTION

The present invention is directed to a method for long term evolution LTE uplink power control for communications between a plurality of both eNodeB and user equipment UE, the method includes measuring by user equipment UE downlink pathloss which is sent to an eNodeB that determines uplink UL transmit power based on the downlink pathloss, under an open loop power control that is selected; and measuring by a neighboring eNodeB interference power on each resource block that is sent to a serving eNodeB, the serving eNodeB computing an average interference power for each scheduled user and determines a most strongly interfered neighbor eNodeB by each UE, setting a power adjustment based on a target interference and an average maximum interference power, updating the power adjustment if a UE is not sufficiently scheduled and setting an uplink transmit power, under a closed loop power control that is selected.

These and other advantages of the invention will be apparent to those of ordinary skill in the art by reference to the following detailed description and the accompanying drawings.

BRIEF DESCRIPTION OF THE DRAWINGS

FIG. 1A shows the uplink power control for LTE and LTE-A, in accordance with the invention;

FIG. 2A is a block diagram of the open loop aspect shown in FIG. 1A, in accordance with the invention;

DETAILED DESCRIPTION

The present invention is directed to uplink power control for LTE and LTE-A that includes open-loop and closed-loop power control aspects to simultaneously bring down the average and the variance of the interference power in neighboring cells. Reducing the average interference increases the signal-to-noise-interference-ratio SINR values in neighboring cells. Also reducing the variance of the interference enables more accurate estimation of SINR values and the modulation and coding scheme MCS selection. Together they improve the system throughput significantly.

The inventive uplink power control for LTE and LTE-A obtains a 7-8% average user throughput improvement without sacrificing cell-edge user throughput in a network with low penetration loss and they obtain 4-6% gain on the average user throughput and 15-23% gain on the cell-edge throughput, all compared to the 3GPP FPC scheme.

Referring to FIG. 1A, there is shown an exemplary diagram of the inventive uplink power control for LTE and LTE-A. An exemplary UL power control module is responsive to power signals and interferences between eNodeBs and user equipment UE units.

Figure 4A:
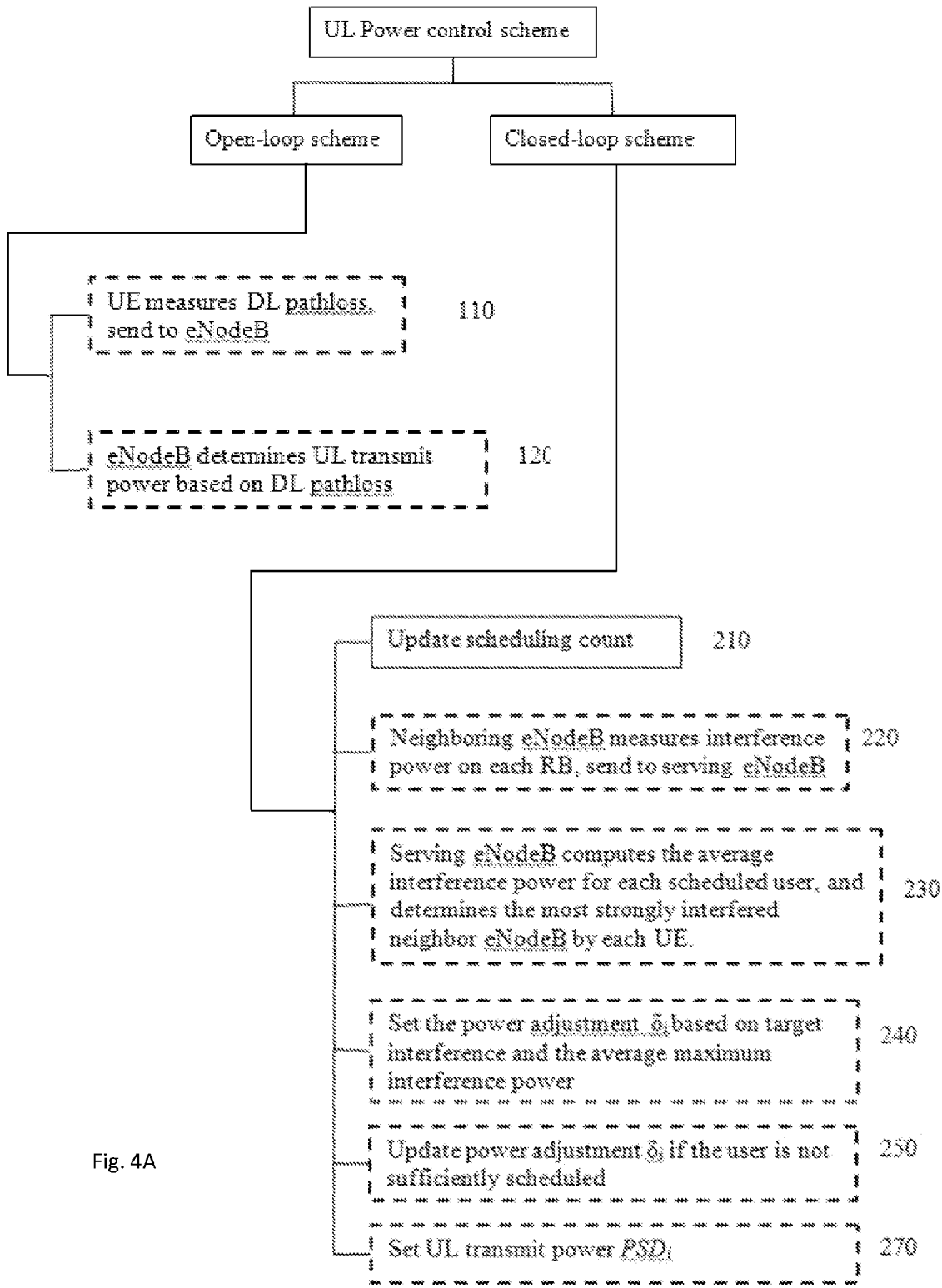
FIG. 4A is a block diagram of the steps of the uplink power control for LTE and LTE-A, in accordance with the invention.

The inventive uplink power control includes open loop steps, shown in block diagrams of FIGS. 2A and 4A. The user equipment UE estimates downlink DL pathloss (including shadowing) $PL_{DL,i}$ and $PL_{DL,i}^{strNB}$ from the serving cell and the most strongly interfered neighboring cell, respectively 110. The eNodeB determines the transmit PSD (which is the per-RB transmit power):

$$PSD_i = \min(PSD_{max}, P_0 + \alpha \cdot PL_{DL,i} + \delta^{max}, \Gamma_0 + PL_{DL,i}^{strNB}),$$

where $PSD_{max}$ is the maximum transmit PSD, $P_0$ is the desired receiving power, $\alpha$ is the fraction of the pathloss compensation, $\delta^{max}$ is the maximum power increase over FPC, and $\Gamma_0$ is the target interference power 120.

Figure 3A:
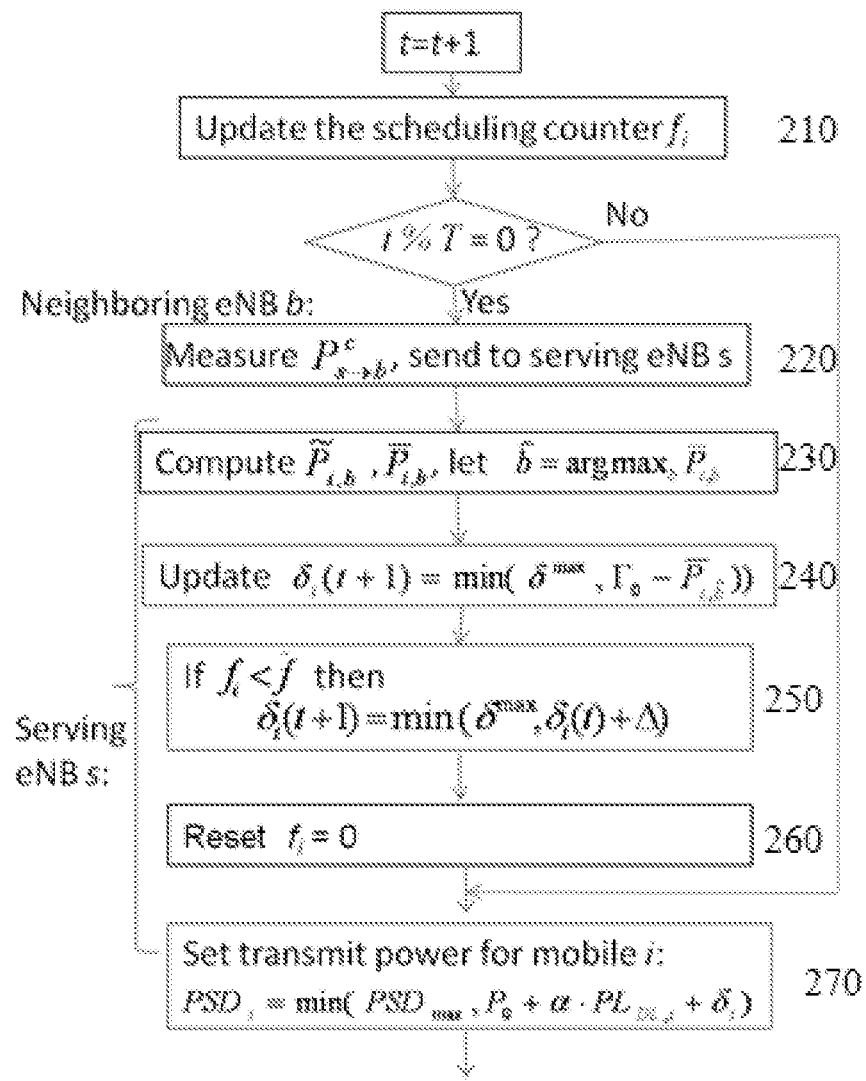
FIG. 3A is a block diagram of the closed loop aspect shown in FIG. 1A, in accordance with the invention.

The inventive uplink power control includes closed loop steps, shown in FIG. 3A. Initially, a scheduling count $f_i$ is updated 210, and then a neighboring eNodeB measures interference power on each resource block RB, and sends it to the serving eNodeB 220 (e.g., measure $P_{S \to b}^C$, send to serving eNBs). A serving eNodeB computes the average interference power for each scheduled user, and determines the most strongly interfered neighbor eNodeB by each UE 230 (e.g, compute $\hat{P}_{i,b}$, $\bar{P}_{i,b}$, let $b = \text{argmax}_b \bar{P}_{i,b}$). Then there is a setting of the power adjustment $\delta_i$ based on target interference and the average maximum interference power 240 (e.g, update $\delta_i(t+1) = \min(\delta^{max}, \Gamma_0 - \bar{P}_{i,b})$. The power adjustment $\delta_i$ is updated if the user is not sufficiently scheduled 250 (e.g., if $f_i < f$ then $\delta_i(t+1) = \min(\delta^{max}, \delta_i(t) + \Delta)$. Reset fi=0 260. Lastly, the uplink transmit power PSDi is set 270 (e.g., set transmit power for mobile i: $PSD_i = \min(PSD_{max}, P_0 + \alpha \cdot PL_{DL,i} + \delta_i))$.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for long term evolution LTE uplink power control for communications between a plurality of both eNodeB and user equipment UE, said method comprising the steps of:

measuring by user equipment UE downlink pathloss which is sent to an eNodeB that determines uplink UL transmit power based on the downlink pathloss, under an open loop power control that is selected; and measuring by a neighboring eNodeB interference power on each resource block that is sent to a serving eNodeB, the serving eNodeB computing an average interference power for each scheduled user and determines a most strongly interfered neighbor eNodeB by each UE, setting a power adjustment based on a target interference and an average maximum interference power, updating the power adjustment if a UE is not sufficiently scheduled and setting an uplink transmit power, under a closed loop power control that is selected.

2. The method of claim 1, wherein said downlink pathloss includes pathloss $PL_{DL,i}$ $PL_{DL_j}$ and $PL_{DL,i}^{strNB}$ from the serving cell and the most strongly interfered neighboring cell, respectively.

3. The method of claim 1, wherein the eNodeB determining uplink UL transmit power based on the downlink pathloss includes determining the transmit PSD, which is the per-RB transmit power.

4. The method of claim 3, wherein the transmit PSD comprises $PSD_i = \min(PSD_{max}, P_0 + \alpha \cdot PL_{DL,i} + \delta^{max}, \Gamma_0 + PL_{DL,i}^{strNB})$ where $PSD_{max}$ is the maximum transmit PSD, $P_0$ is the desired receiving power, $\alpha$ is the fraction of the pathloss compensation, $\delta^{max}$ is the maximum power increase over FPC, and $\Gamma_0$ is the target interference power.

* * * * *